April 17, 1956 — P. M. SHEY — 2,741,788
WIPER CLEANER ATTACHMENT
Filed Oct. 4, 1954 — 2 Sheets-Sheet 1
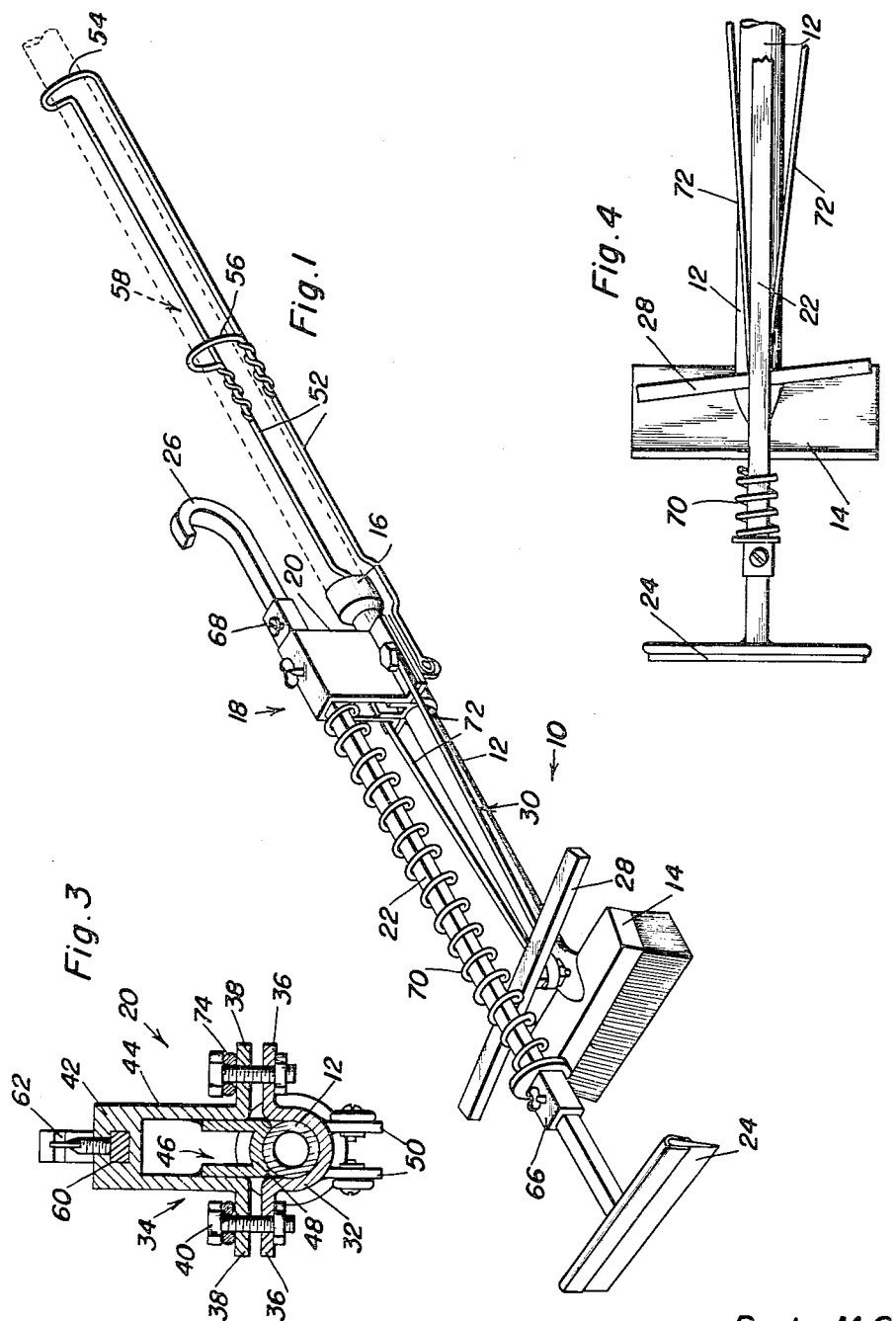
Porter M. Shey
INVENTOR.

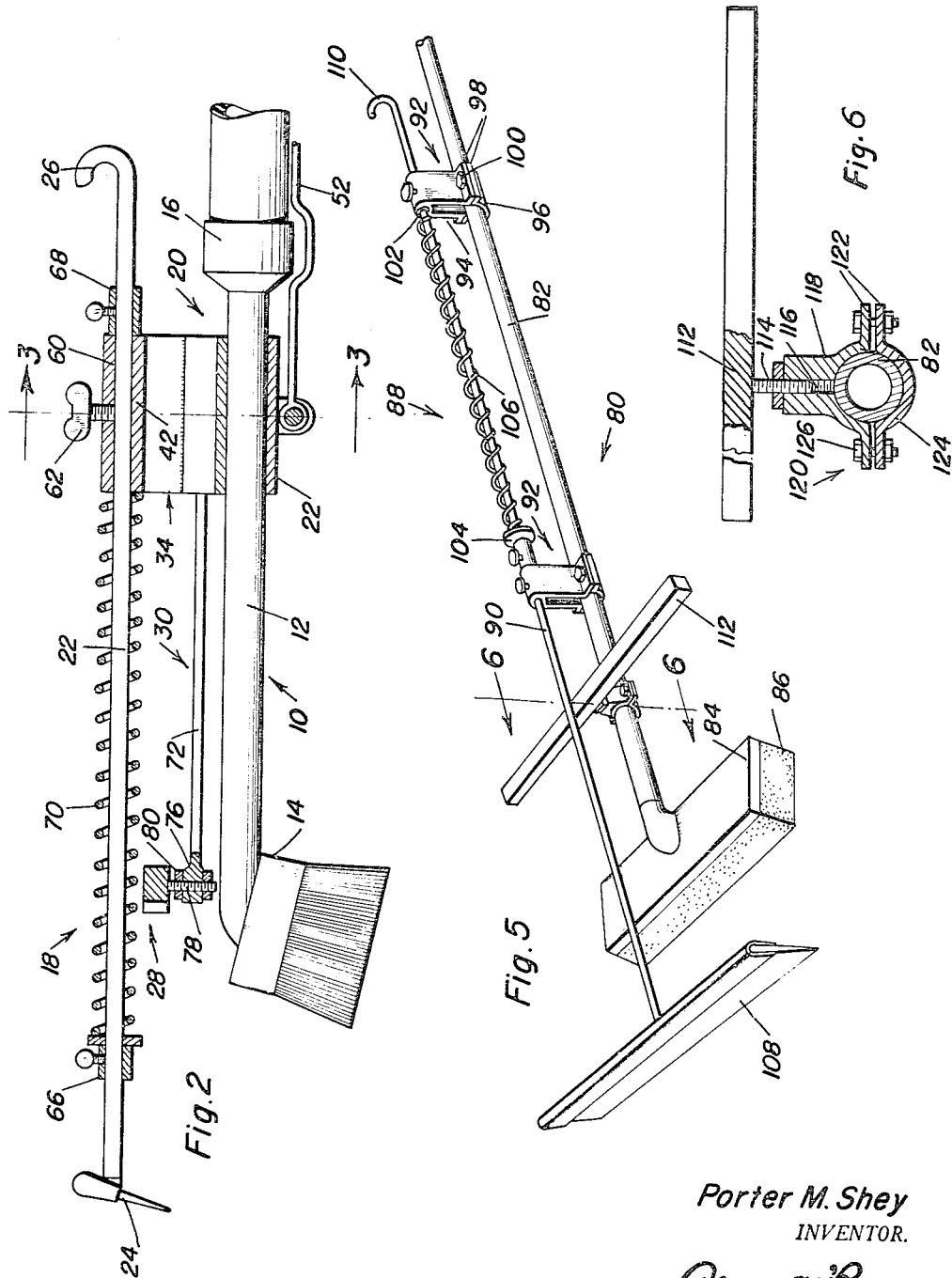

United States Patent Office 2,741,788
Patented Apr. 17, 1956

2,741,788

WIPER CLEANER ATTACHMENT

Porter M. Shey, Detroit, Mich.

Application October 4, 1954, Serial No. 460,139

11 Claims. (Cl. 15—105)

The present invention relates to washing devices, and more particularly relates to a wiper blade and wiper blade cleaner attachment for mounting on a handled washing element.

In many washing devices, such as window cleaners, hose mounted car washing attachments, hand mops, etc., it is often desirable to provide a wiping element to remove the liquid film left by the washing element. However, in conventional combination washing and wiping elements, there is no provision for automatically wiping the blade of the wiping element thereby necessitating hand wiping the wiping blade after each wiping operation creating in many instances, particularly window washing, hazard to both life and limb and at all times causing great inconvenience in that after each wiping operation, the combination washing and wiping device must be manipulated into a position whereby the wiping blade may be wiped for the next operation.

The basic object of the present invention is to provide a wiping attachment for washing elements where no unnecessary manipulation is necessary to wipe the wiping blade of the wiping element, the cleaning of the wiping blade being accomplished automatically upon reciprocation of the handle carrying the wiping blade.

It is another object of the invention to provide a wiping and wiper cleaner attachment for both hose mounted washing heads and conventional mop handles and the like which includes a cleaning element for the wiper blade which may be adjusted at different angles to the blade and at different heights with respect to the blade to perform the most efficient cleaning action for any given operation.

A still further object of the invention is in the provision of a wiper attachment for washing devices which will automatically return to its wiping position after cleaning of the blade by a cleaning element provided with the attachment.

A still further object of the invention is in the provision of a wiping attachment which is particularly adapted for mounting on hose mounted washing head handles which structure may be mounted as a unitary assembly on the washing head handle without interfering with the normal operation of the washing head nor adding excessive weight thereto, while at the same time stiffening a portion of the hose adjacent the end thereof to which the washing head is attached.

A final object of the invention to be mentioned specifically is in the provision of a wiper and wiper cleaner attachment for mounting on squeegee handles, mop handles, etc., simply and quickly and which will interfere in no manner with the operation of the washing device.

These together with other objects and advantages of this invention which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a hose mounted washing assembly to which the wiper and wiper cleaner attachment of the present invention has been applied;

Figure 2 is a side elevational view of the wiping attachment with parts thereof being shown in cross-section for clarity of detail;

Figure 3 is a vertical sectional view taken substantially along the plane of section line 3—3 of Figure 2;

Figure 4 is a top view of the attachment with certain parts being broken away for clarity of detail;

Figure 5 is a perspective view of a modified wiper and cleaner attachment of the present invention for mop handles and the like; and Figure 6 is a cross-sectional view taken substantially along the plane of section line 6—6 of Figure 5.

Noting first Figures 1–4 of the drawings, there is shown in these figures a hose mounted washing head structure 10 consisting of a tubular handle 12 opening at one end into a brush head 14 and at its other end into a hose end connector 16 whereby the handle 12 may be attached to a hose or hose nozzle. Mounted on the handle 12 is the wiper attachment constituting the present invention, designated by the numeral 18 in its entirety.

The attachment 18 comprises in essence a mounting means in the form of a bracket 20 for mounting the attachment on the handle 12 of the washing assembly, a wiper blade handle 22 slidably mounted in the bracket 20 and having a wiper blade 24 at one end thereof and an upturned hook 26 at the other end thereof, forming a gripping means for the handle, and a cleaning element 28 which is attached to the bracket 20 by means of a supporting structure 30.

Noting Figure 3, taken in conjunction with Figures 1 and 2, the bracket 20 will be most clearly observed, this bracket being basically in the form of first and second clamp sections 32 and 34, respectively, having flat, spaced, parallel flanges 36 and 38 through which extend fasteners 40 to clamp the sections to one another around the handle 12 of the washing device 10. The undersection of the clamp 32 is in the form of a saddle embracing the undersurface of the handle 12 whereas the upper section 34 of the clamp is substantially U-shaped, having a bight portion 42, legs 44 and outturned flanges 38, previously described, at the free ends of these legs. Between the legs 44 adjacent their free ends is secured a U-shaped plate 46, the legs of which are attached to the inner surfaces of the legs 44 of the upper section 34, the bight portion 48 of this clamp section being disposed below the outturned flanges 38 and contoured to fit the top surface of the handle 12 so that upon tightening of the fasteners 40, the bracket 20 will be rigidly clamped to the handle 12.

Spaced lugs 50 depend from the undersurface of the lower clamp section 32 in transversely spaced, parallel relation to one another.

Riveted or otherwise secured to each lug 50 are elongated rearwardly extending legs 52, preferably formed from a stiff, resilient wire member, the rearward ends of the legs 52 being integrally joined to one another by means of the upwardly bent arcuated bight portion 54 shown in Figure 1. Intermediate the ends thereof, the legs 52 are bridged by a second arcuate, resilient wire element 56. The purpose of the legs 52, arcuate resilient elements 54 and 56 and the attachment of the forward ends of the legs 52 to the lugs 50 is to provide a saddle bearing to grasp or clamp the end portion of a hose, shown in phantom outline in Figure 1 and designated by the numeral 58, to which the hose connector 16 is attached, thereby stiffening this end section of the hose whereby the same may serve as a handle for the washing attachment 10 while at the same time affording additional support for the wiper attachment 18.

The wiper handle 22 is preferably non-circular in cross-section and slides through a non-circular bore through the bight portion 42 of the upper section 34 of the clamp or bracket 20, this bore being designated by the numeral 60. A transverse, threaded bore through the top of the bight portion 42 of the bracket section 34 receives a suitable thumb screw 62 by means of which the handle 22 may be fixedly adjusted within the bore 60.

Stop elements 66 and 68, respectively, are adjustably mounted at longitudinally spaced intervals along the handle 22, the bracket 20 being disposed between these stop elements. A suitable resilient spring 70 surrounds the handle 22 and reacts between the bracket 20 and the stop element 66 to urge the handle outwardly beyond the brush head 14 of the washing assembly 10 whereby the wiping blade 24 may perform its intended function.

To mount the cleaning element 28, which consists in the embodiment shown in Figures 1-4 of an elongated, rigid, rectangular bar disposed beneath the handle 22, at a selected angle with respect to the handle 22 and the wiper blade 24, the supporting structure 30 previously mentioned is utilized.

This supporting structure consists essentially of a pair of arms 72 having eyes 74 formed at their rearward ends through which the fasteners 40 securing the bracket sections 32 and 34 together extend to rigidly clamp the rearward ends of these arms to the bracket 20. From their rearward ends, the arms 72 converge toward one another and terminate at their forward ends in a closed eye 76.

The cleaning element 28 is provided at its central portion with a downwardly projecting fastener 78 threadedly received in the bore of the eye 76 to provide a means for vertically adjusting the cleaning element as well as controlling the angle thereof. Lock nuts 80 on the fastener 78 above and below the eye 76 lock the fastener 78 in any selected position within the bore of the eye 76, thereby adjusting both the height and the angularity of the cleaning element 28.

The operation of the device is exceedingly simple, the handle 22 being initially pulled clear back behind the head 14 of the washing assembly 10 until the washing operation is completed. Then, the setscrew 62 is loosened to permit the handle 22 to reciprocate within the bore 60 of the bracket 20. Spring 70 urges the handle 22 outwardly from the brush head 14 so that the wiping blade 24 is disposed remote therefrom to perform its wiping action without interference from the brush head 14.

After the wiping element or blade 24 completes a wiping operation, the hooked end 26 of the handle 22 may be gripped and the handle pulled backwardly so that the wiping blade 24 is drawn over the cleaning element 28. The gripping hook 26 is then released and the handle is again pressed outwardly by virtue of the spring 70 and the second wiping action of the wiper 24 may be carried out. Obviously, with this arrangement, the wiping blade 24 is automatically cleaned upon each operation thereof by the simple expedient of pulling back on the hooked end 26 of the handle 22 and then releasing the same.

In the embodiment of the invention shown in Figures 5 and 6, there is disclosed a conventional washing device 80 comprising a handle 82 and a head 84 to which a sponge or the like 86 is attached. The wiping attachment, constituting a second form of the present invention, shown in Figure 5, is designated by the numeral 88.

The attachment 88 is typified by the provision of an elongated handle 90 extending lengthwise of the mop handle 82. Spaced brackets 92 mount the handle 90 on the mop handle 82. Each of the brackets 92 consists of upper and lower clamp sections 94 and 96 having outturned parallel flanges 98 through which fasteners 100 extend to clamp each bracket to the handle 82.

The upper section 94 of each bracket is in the form of an inverted U-shaped member, the bight portion of which is formed with a longitudinal bore 102 therethrough through which the handle 90 slides.

Stop member 104 is fixedly mounted on the handle 90 between brackets 92 and resilient spring 106 reacts against a stop member 104 and the rearmost bracket 92.

The forward end of the handle 90 is provided with a wiping blade 108, and the rearward end of the handle 90 is upwardly hooked, as at 110, to form a gripping portion for reciprocating the handle 90 through the bore 102 and the brackets 92.

The attachments 88 and 18 are interchangeable in use in many instances; for example, the attachment 18 would be mounted on handle 82 and attachment 88 would be mounted on handle 12.

Washing element 112 is identical to washing element 28 described in the previous modification of the invention and consists of an elongated, rigid bar from the central portion of which depends a threaded fastener 114.

The fastener 114, as will be noted in Figure 6, is threadedly received in a bore 116 on the upper section 118 of clamp 120 which secures the cleaning element 112 to the handle 82 forwardly of the foremost bracket 92, between this bracket and the mop head 84.

The upper section 118 of clamp 120 is provided with a pair of outturned clamping flanges 122 and the lower section 124 of the clamp 120 is provided with identical outturned flanges and fasteners 126 secure the sections 118 and 124 to one another to clamp the cleaning element 112 rigidly to the handle 82.

Since the operation of this modification of the invention is identical to that of the previously described modification, further description is not believed necessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use with a hose mounted washing brush and handle, a wiper attachment comprising a bracket for mounting on the brush handle, a wiper handle and blade assembly slidably mounted on said bracket, a saddle extending rearwardly from said bracket for grasping and stiffening a portion of a hose adjacent the end thereof, a supporting structure extending forwardly from said bracket, a wiper blade cleaner on said supporting structure engaged by the wiper blade upon sliding movement of said assembly.

2. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element.

3. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element, said supporting means including a supporting structure to which said cleaning element is attached, said supporting structure including means adjustably connecting said cleaning element thereto for movement toward and away from said blade handle.

4. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element, said supporting means including a pair of arms secured at one set of their ends to said mounting means and converging toward one another to their other ends, means attaching said cleaning element to said arms at said other ends thereof.

5. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element, said supporting means including a supporting structure to which said cleaning element is attached, said supporting structure including means adjustably connecting said cleaning element thereto for movement toward and away from said blade handle, said adjustably connecting means including an adjustable element for raising and lowering said cleaning element.

6. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element, at least one stop element on said blade handle, resilient means reacting against said mounting means and said stop element urging said blade in one direction.

7. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element, said supporting means including a pair of arms secured at one set of their ends to said mounting means and converging toward one another to their other ends, means attaching said cleaning element to said arms at said other ends thereof, said other ends of said arms terminating in a closed eye, said attaching means including a threaded fastener received in said eye.

8. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element, said mounting means including a bracket through which said blade handle is longitudinally reciprocable, stop means or said blade handle, resilient means reacting against said bracket and said stop means urging said blade handle in one direction.

9. A wiper attachment, said attachment including means for mounting the same on a mounting member, a wiper blade handle slidably mounted on said mounting means, a wiper blade on said handle, a cleaning element for said blade, means for supporting said cleaning element beneath said wiper blade handle at an angle thereto, and means for sliding said blade handle for wiping said blade over said cleaning element, said mounting means including a pair of longitudinally spaced brackets through which said blade handle is longitudinally reciprocable, resilient means between said brackets reacting against one of said brackets and a portion of said blade handle urging said blade handle in one direction, stop means limiting movement of said handle in said one direction.

10. A wiper attachment, said attachment including means for mounting the same on a mounting member, a wiper blade handle slidably mounted on said mounting means, a wiper blade on said handle, a cleaning element for said blade, means for supporting said cleaning element beenath said wiper blade handle at an angle thereto, and means for sliding said blade handle for wiping said blade over said cleaning element, said means for sliding said handle including gripping means at the free end of said handle.

11. For use with a hose mounted washing head and handle, a wiper attachment comprising a bracket for mounting on the washing head handle, a wiper handle and blade assembly slidably mounted on said bracket, a saddle extending rearwardly from said bracket for grasping and stiffening a selected length of hose, a supporting structure extending forwardly from said bracket, a wiper blade cleaner disposed beneath said wiper blade on said supporting structure and engaged by the wiper blade upon sliding movement of said assembly.

References Cited in the file of this patent

UNITED STATES PATENTS

| | | |
|---|---|---|
| 1,282,780 | Dunagan | Oct. 29, 1918 |
| 1,818,917 | Wolf | Aug. 11, 1931 |
| 2,673,999 | Shey | Apr. 6, 1954 |

FOREIGN PATENTS

| | | |
|---|---|---|
| 8,483 | Great Britain | of 1911 |
| 25,226 | Great Britain | of 1912 |